H. E. SNOW.

Assignor of one-half to C. F. MENDE.

CUFF HOLDER.

No. 11,253. Reissued July 12, 1892.

Witnesses:
Carl. F. Mende
J. F. Harris

Inventor:
Henry E. Snow.
By W. M. Brown
his Atty.

UNITED STATES PATENT OFFICE.

HENRY E. SNOW, OF ALBANY, NEW YORK, ASSIGNOR OF ONE-HALF TO CARL F. MENDE, OF SAME PLACE.

CUFF-HOLDER.

SPECIFICATION forming part of Reissued Letters Patent No. 11,253, dated July 12, 1892.

Original No. 466,311, dated December 29, 1891. Application for reissue filed April 19, 1892. Serial No. 429,821.

*To all whom it may concern:*

Be it known that I, HENRY E. SNOW, a citizen of the United States, and a resident of Albany, in the county of Albany and State of New York, have invented certain new and useful Improvements in Cuff-Holders; and I do hereby declare that the following is a full, clear, and exact description of the invention, that will enable others skilled in the art to which it appertains to make and use the same, reference being had to the accompanying drawings, and to the figures of reference marked thereon, which form a part of this specification.

This invention relates to improvements in cuff-holders, the objects in view being to provide a cheap and simple device for conveniently and adjustably attaching in a secure manner cuffs to the sleeve-buttons of shirts.

A further object in view is to so construct the device as to spread the ends of an ordinary pair of cuffs, whereby the latter, if desired, may be employed in connection with the ordinary link cuff-button.

To use the ordinary link cuff-button, it now requires a special form of cuff to be employed therewith, which, as is well known, retails higher and is less economical in use by reason of the fact that but one end of the cuff can be used. Double-ended cuffs of the link-button pattern have been provided, but are necessarily so long as as to be inconvenient.

By my invention I propose to utilize the ordinary cuff as a link-button cuff, giving the same the precise appearance as such, and yet securing the advantages of reversibility and economy.

With the above objects in view the invention consists in certain features of construction hereinafter specified, and particularly pointed out in the claims.

Figure 1:
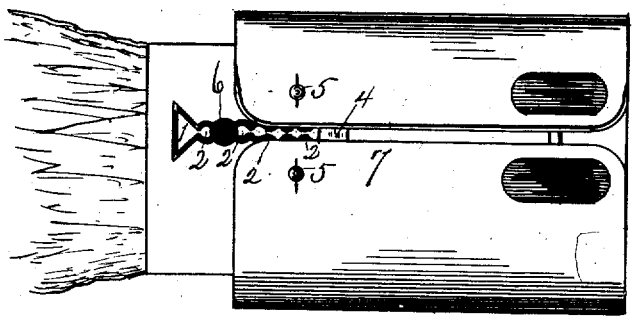
Figure 2:
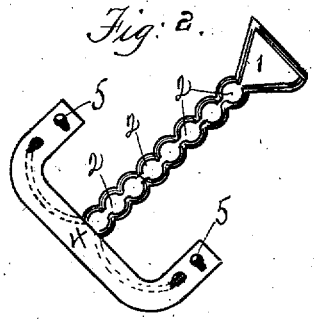
Figure 3:
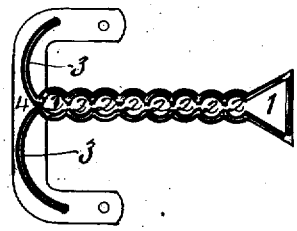

Referring to the drawings, Figure 1 is a perspective of a cuff and a portion of the sleeve, the two being connected by a holder constructed in accordance with my invention. Fig. 2 is a detail in perspective of the holder. Fig. 3 is a reverse plan view of the holder.

Like numerals of reference indicate like parts in all the figures of the drawings.

In constructing the shank of the holder I employ a piece of spring-wire of suitable length, bending the same at each side of the center to form the triangular eye or loop 1, beyond which the terminals are bent in zigzag form or sinuous, forming a series of eyes 2, said terminals touching, or nearly so, between each of the eyes. Near their ends the terminals are bent to form curved springs 3, and are abruptly outwardly bent and passed through the terminals of a U-shaped sheet-metal plate 4, upon the face of which said terminals are headed, whereby the plate and terminals are secured together. The plate 4 is curved transversely, and upon its upper face, near the ends of its terminals, is provided with threaded studs 5.

The loop 1 is slightly curved as a whole, so as to be readily grasped by the thumb and forefinger of the user and introduced over the button 6 of the shirt-sleeve, and after such introduction the device may be moved forward or backward, so that the shank of said button will occupy any one of the eyes 2, and hence lengthen or shorten the shank in accordance with the amount of cuff the user desires to display below his coat-sleeve. In such movement the sides of the loop 1 and the curved springs 3 yield as the shank passes between the contacting-points between the eyes 2. By providing the springs formed by the loop and the bent ends 3 it will be seen that a double spring is formed, so that sufficient resistance is offered to the slipping of the button-shank from eye to eye, whether forward or backward.

In operation, previous to mounting the device upon the sleeve-button, the two studs 5 are introduced into the lower holes of the cuff 7, and being located some distance apart, as shown, hold the edges thus distended or separated, giving the cuff the appearance of an ordinary link-button cuff. The link-button of course occupies the upper pair of button-holes, and when displayed below the shirt-sleeve the appearance of the cuff to that of the well-known link-button cuff is identical.

From the foregoing description, taken in connection with the accompanying drawings, it will be seen that I provide a ready attachment between shirt-sleeves and cuffs designed to be adjusted so as to display as much of the cuff as desired, and which, while permitting of the reversing of the ends of the cuff, will give the same the appearance of the well-known link-button cuff.

Having described my invention, what I claim is—

1. The herein-described improved cuff-holder, comprising a wire loop or shank, the opposite sides of which are bent into sinuous form, providing intermediate eyes, at one end having an enlarged eye adapted to take over the head of a cuff-button and at the other end having its terminals oppositely curved to form spring-arms, a transverse plate secured to the extremities of the curved ends, and studs located at opposite sides of the shank and projecting from the transverse plate and adapted to engage with the opposite holes of a cuff, substantially as specified.

2. The herein-described improved cuff-holder, the same consisting of the loop-shaped wire shank, the opposite sides of which are bent into sinuous form to form eyes adapted to be connected with a shirt-sleeve button, and the U-shaped plate connected to the shank, the terminals of the plate being provided upon their outer faces and at opposite sides of the shank with buttonhole-engaging studs, substantially as specified.

3. The herein-described improved cuff-holder, the same consisting of the spring-wire shank having the triangular loop located at one end and slightly bent, the spring-terminals of which are bent in a sinuous form to provide a series of eyes and at their extremities are deflected and curved to form spring-arms, and the U-shaped securing-plate, through the arms of which the wire terminals of the shank are passed and headed, and the headed studs mounted upon the arms of said plate and adapted to engage the buttonholes of a cuff, substantially as specified.

4. A cuff-holder consisting of a shank having a loop or opening at one end and eye-holes in the body of the shank to engage with the shirt-sleeve button or fastener and having a bar or prolongation laterally projecting from each side of the other end of the shank, the terminals of said bar or prolongation being arranged to engage with the oppositely-located buttonholes of the cuffs, substantially as described.

In testimony whereof I affix my signature in presence of two witnesses.

HENRY E. SNOW.

Witnesses:
W. M. BROWN,
CARL F. MENDE.